(12) United States Patent
Shi et al.

(10) Patent No.: US 7,271,967 B2
(45) Date of Patent: Sep. 18, 2007

(54) SYSTEM AND METHOD FOR DETERMINING WHETHER DEFECT IN PERPENDICULAR RECORDING DISK DRIVE IS FROM THERMAL ASPERITY OR DEFECT IN MAGNETICALLY SOFT UNDERLAYER

(75) Inventors: Zhupei Shi, San Jose, CA (US); Li Tang, Fremont, CA (US); Jane Jie Zhang, San Jose, CA (US); Shanlin Duan, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 280 days.

(21) Appl. No.: 10/975,259

(22) Filed: Oct. 28, 2004

(65) Prior Publication Data

US 2006/0092538 A1 May 4, 2006

(51) Int. Cl.
*G11B 27/36* (2006.01)
*G11B 5/02* (2006.01)
(52) U.S. Cl. .......................................... 360/31; 360/25
(58) Field of Classification Search ..................... None
See application file for complete search history.

(56) References Cited

U.S. PATENT DOCUMENTS

| | | | | |
|---|---|---|---|---|
| 5,532,586 A * | 7/1996 | Ishikawa | ..................... | 324/212 |
| 5,805,551 A * | 9/1998 | Oshima et al. | ................ | 360/48 |
| 5,815,342 A | 9/1998 | Akiyama et al. | ......... | 360/97.01 |
| 6,373,647 B1 * | 4/2002 | Baker | ........................... | 360/25 |
| 6,628,466 B2 * | 9/2003 | Alex | ............................ | 360/31 |
| 6,667,848 B1 | 12/2003 | Khizroev et al. | ............ | 360/125 |
| 6,671,117 B2 | 12/2003 | Dimitrov et al. | .............. | 360/57 |
| 6,940,670 B2 * | 9/2005 | De Jong et al. | .............. | 360/25 |
| 6,965,229 B2 * | 11/2005 | Duan et al. | ................... | 324/210 |
| 2002/0034052 A1 | 3/2002 | Takeo et al. | ............. | 360/264.7 |
| 2003/0021070 A1 | 1/2003 | Ohtsu et al. | ................. | 360/317 |
| 2003/0053235 A1 | 3/2003 | Kikugawa et al. | ............ | 360/31 |
| 2004/0075958 A1 | 4/2004 | Takeo | ......................... | 360/313 |

FOREIGN PATENT DOCUMENTS

| | | |
|---|---|---|
| JP | 8045068 | 2/1996 |
| JP | 2004095022 | 3/2004 |
| JP | 2004145939 | 5/2004 |

* cited by examiner

*Primary Examiner*—Andrea Wellington
*Assistant Examiner*—Varsha A. Kapadia
(74) *Attorney, Agent, or Firm*—John L. Rogitz

(57) ABSTRACT

A method for determining whether a spike in a read back signal from a read head positioned over a perpendicular recording disk having a magnetically soft underlayer (SUL) is caused by a defect in the SUL or by a thermal asperity (TA). A first read back signal with the spike is obtained in the absence of a local magnetic field near the read head. Then, a permanent magnet or electromagnet is used to induce a small local magnetic field by the read head, and a second signal is obtained. If the signals are substantially similar, a thermal asperity is indicated. Otherwise a defect in the 13 magnetically soft underlayer of the disk is indicated.

18 Claims, 2 Drawing Sheets spin stand schematic spin stand schematic logic using permanent magnet no magnet magnet - TA defect magnet - SUL defect logic using electromagnet

SYSTEM AND METHOD FOR DETERMINING WHETHER DEFECT IN PERPENDICULAR RECORDING DISK DRIVE IS FROM THERMAL ASPERITY OR DEFECT IN MAGNETICALLY SOFT UNDERLAYER

I. FIELD OF THE INVENTION

The present invention relates generally to hard disk drives (HDD), and more particularly to identifying whether a magnetically soft underlayer (SUL) of a HDD employing perpendicular recording principles is defective.

II. BACKGROUND

In hard disk drives (HDD) employing perpendicular recording, a magnetically soft underlayer (SUL) is used just below the surface of a disk to conduct return magnetic flux in the recording media. As recognized herein, however, the SUL can introduce unwanted noise spikes in the read back signal, owing to domain transitions in the film that is part of the SUL. Accordingly, it is important to detect disks having defective SUL during the manufacturing and assembly process, to dispose of the disk before it is incorporated into a HDD and/or to identify and correct earlier manufacturing errors.

As further understood herein, spin stand fixtures can be used during manufacture to spin a disk, with a read head positioned over the disk as it would be during HDD operation, to detect any spikes that might be present in the read back signal. As critically recognized herein, however, spikes may be introduced not just by defects in the SUL, but also by thermal asperities (TA) caused by defects in the disk surface itself. The latter defects implicate a different error mode and, hence, different corrective actions. As a consequence, it is important to know whether a spike is caused by a SUL defect or by a TA. Having made this observation, the invention herein is provided.

SUMMARY OF THE INVENTION

A method is disclosed for determining whether a spike in a read back signal from a read head positioned over a disk having a magnetically soft underlayer (SUL) is caused by a defect in the SUL or by a thermal asperity (TA). The method includes obtaining a first read back signal with spike, and after that inducing a small magnetic field nearby the head. The method further includes obtaining a second read back signal in the presence of the small magnetic field. The first and second signals are compared, and based on the comparison, an indication is rendered of the cause of the spike.

The small magnetic field can be induced by closely juxtaposing a permanent magnet with the head or by juxtaposing an electromagnet with the head and energizing the electromagnet. The method can be executed using a spin stand.

If the "before" and "after" signals mentioned above are substantially similar to each other, a thermal asperity is indicated; otherwise, a defect in the SUL is indicated. The method can include visually comparing the signals, or the signals may be compared by a computer that renders the indication.

In another aspect, a test fixture includes means for spinning a disk past a read head, and means for obtaining first and second read back signals with no local magnetic field induced by the head and with a local magnetic field induced by the head, respectively. Means are provided for comparing the signals to determine whether a defect exists on the surface of the disk or below the surface of the disk.

In still another aspect, a computer program product is disclosed that is readable by a digital processing apparatus to execute logic. The logic includes comparing a first signal from a read head positioned over a perpendicular recording disk under a first magnetic condition to a second signal from the read head obtained under a second magnetic condition, with the signals indicating a defect in the disk. If the signals are substantially similar, a thermal asperity is indicated. Otherwise a defect in a magnetically soft underlayer of the disk is indicated.

Thus, a general purpose computer may be programmed according to the inventive steps herein. The invention can also be embodied as an article of manufacture—a machine component—that is used by a digital processing apparatus and which tangibly embodies a program of instructions that is executable by the digital processing apparatus to execute the present logic. This invention may be realized in a machine component that causes a digital processing apparatus to perform the inventive method steps herein.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
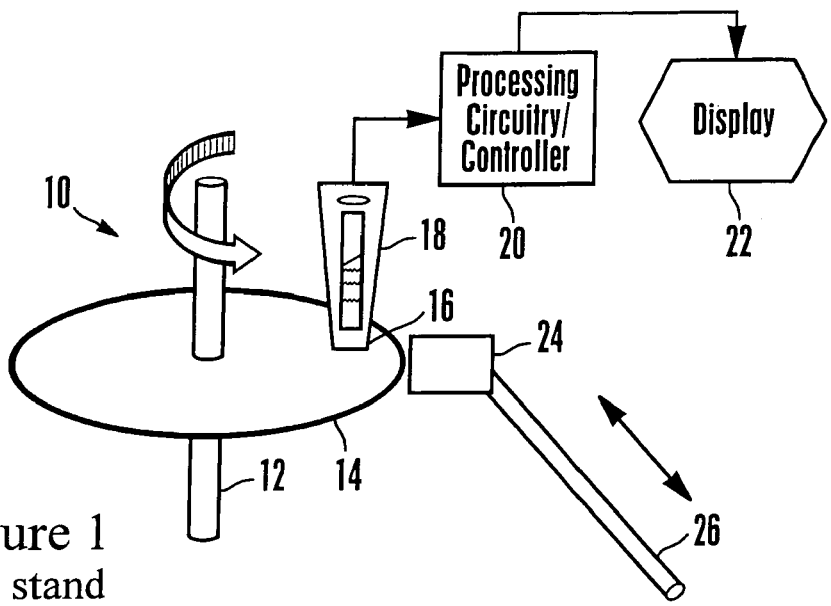
FIG. 1 is a block diagram of the present system.

Referring initially to FIG. 1, a system is shown, generally designated 10, which includes a test fixture including a spindle 12 that can be used to rotate a perpendicular recording disk 14 past a perpendicular recording read head 16. The read head 16 is mounted on the end of a read head arm 18, and is electrically connected to processing circuitry 20 in accordance with principles known in the art. The processing circuitry 20 can include a digital processor such as a controller or other processor. The signal from the read head, or an indication derived therefrom as set forth further below, may be presented on a display 22 such as a monitor.

As shown in FIG. 1, the fixture can include a magnetic field element 24 that is closely juxtaposed with the read head 16. In one embodiment, the magnetic field element 24 is a permanent magnet that is mounted on a movable arm 26 for motion next to and away from the read head 16 as shown, to facilitate gathering signals from the read 16 both in the presence of and absence of a small magnetic field (e.g., less than 100 Oe) that is local to the read head 16. Or, the magnetic field element 24 can be established by an electromagnet that is closely juxtaposed with the read head 16 and that is selectively energizable to induce a local magnetic field by the read head 16.

Figure 2:
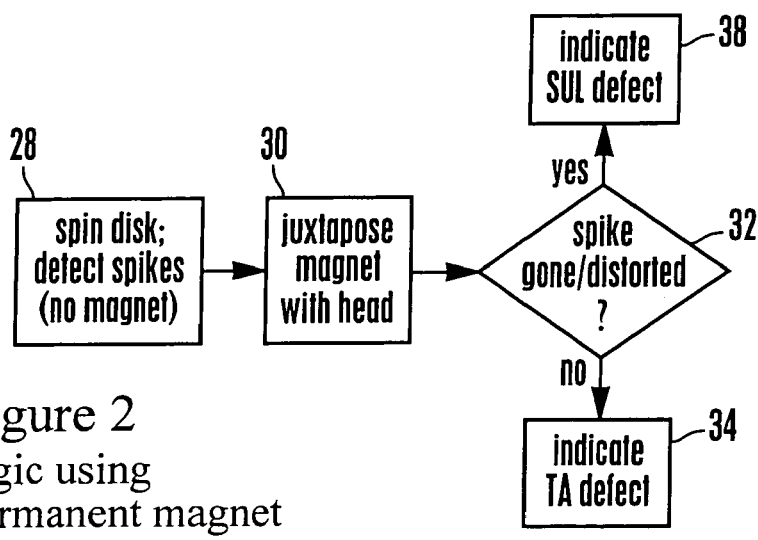
FIG. 2 is a flow chart of the logic for determining whether a spike from the disk is caused by a thermal asperity or a defect in the SUL, using a permanent magnet.

FIG. 2 shows the logic that can be used when a permanent magnet is used as the magnetic field element 24. With respect to the present logic, which may be executed in whole or in part by the controller in the processing circuitry or by another processor, the flow charts herein illustrate the structure of the present logic. In some implementations the logic can be embodied in computer program software. Those skilled in the art will appreciate that in this case, the flow charts illustrate the structures of logic elements, such as computer program code elements or electronic logic circuits, that function according to this invention. Thus, the invention may be practiced by a machine component that renders the logic elements in a form that instructs a digital processing apparatus (that is, a computer) to perform a sequence of function steps corresponding to those shown.

In other words, the flow charts may be embodied in a computer program that is executed by a processor as a series of computer-executable instructions. These instructions may reside, for example, in a program storage device. The program storage device may be RAM of the controller in the circuitry 20, or a magnetic or optical disk or diskette, magnetic tape, electronic read-only memory, or other appropriate data storage device.

Figure 3:
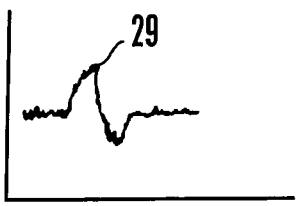
FIG. 3 is a graph illustrating the read head signal in the presence of a defect, with no small local magnetic field imposed near the head.

Commencing at block 28, the disk 14 is rotated and the read back signal from the head 16 obtained, with the permanent magnet distanced from the head. FIG. 3 illustrates what the signal might look like when a defect is in the disk 14, i.e., the spikes 29 indicate one or more defects.

Moving to block 30, the magnet is moved such that it is juxtaposed with the read head 16, thus creating a local magnetic field by the read head 16. The read head signal in the presence of the local magnetic field is compared to the original signal at decision diamond 32 to determine whether the signals are substantially similar. The comparison can be done visually by observing the display 22 or it can be executed by a computer.

Figure 4:
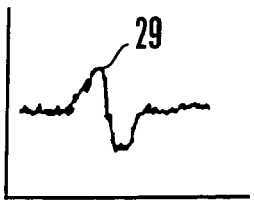
FIG. 4 is a graph illustrating the read head signal in the presence of a thermal asperity (TA) defect, with a small local magnetic field imposed near the head.
Figure 5:
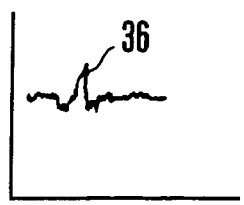
FIG. 5 is a graph illustrating the read head signal in the presence of a defect in the SUL, with a small local magnetic field imposed near the head.

In any case, if the second signal is substantially similar to the first, as is the case illustrated in FIG. 4, which shows substantially the same spikes 29 as appeared in the first signal shown in FIG. 3, the logic moves to block 34 to indicate a thermal asperity on the surface of the disk 14. Otherwise, if the spike is absent or deformed in the second signal as illustrated by the waveform 36 shown in FIG. 5, the logic moves to block 36 to indicate a defect in the SUL just below the surface of the disk 14. The indications at blocks 34, 38 can take any suitable form, e.g., a test technician noting which defect is indicated, or a computer outputting a record or other signal indicating which defect is present.

Figure 6:
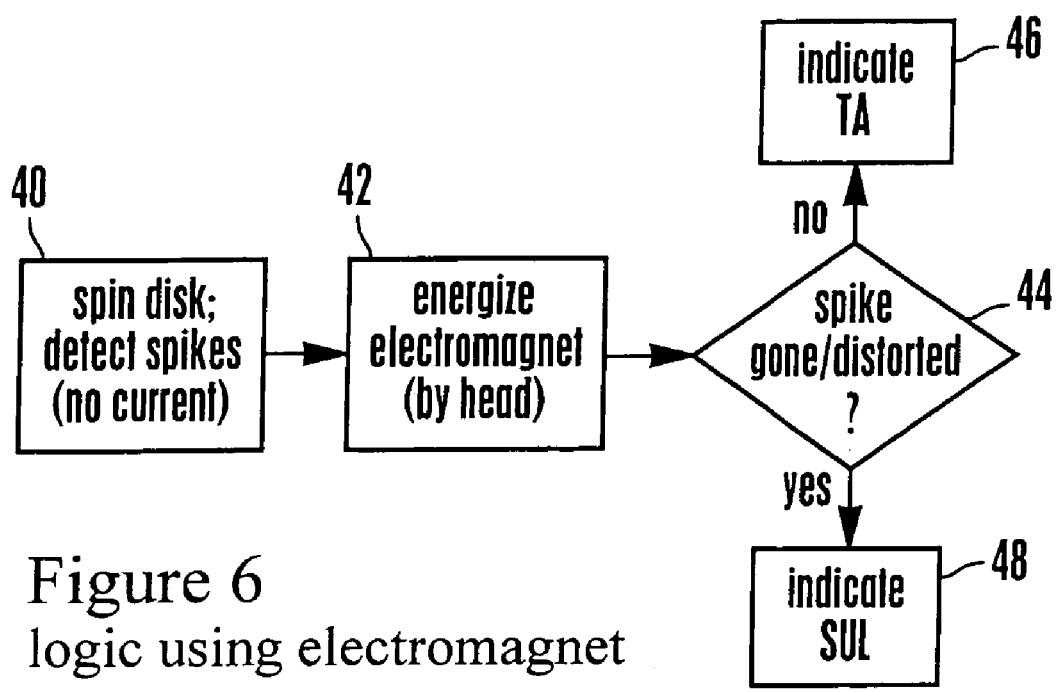
FIG. 6 is a flow chart of the logic for determining whether a spike from the disk is caused by a thermal asperity or a defect in the SUL, using an electromagnet.

FIG. 6 shows the logic that can followed when an electromagnet is used as the magnetic field element 24. Commencing at block 40 the disk 14 is rotated and the read back signal from the head 16 obtained, with the electromagnet deenergized. Moving to block 42, the electromagnet, which is juxtaposed with the read head 16, is energized, thus creating a local magnetic field by the read head 16. The read head signal in the presence of the local magnetic field is compared to the original signal at decision diamond 44 to determine whether the signals are substantially similar. If they are, a TA is indicated at block 46; otherwise, a defect in the SUL is indicated at block 48. Appropriate corrective action is taken depending on the source of the defect, e.g., the disk 14 may be discarded or repaired, and/or earlier manufacturing stages examined to reduce future disk defects.

While the particular SYSTEM AND METHOD FOR DETERMINING WHETHER DEFECT IN PERPENDICULAR RECORDING DISK DRIVE IS FROM THERMAL ASPERITY OR DEFECT IN MAGNETICALLY SOFT UNDERLAYER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for rendering an indication of the cause of a spike in a read back signal from a read head positioned over a disk having a magnetically soft underlayer (SUL), comprising:
   obtaining a first read back signal with spike;
   inducing a small magnetic field nearby the head;
   obtaining a second read back signal in the presence of the small magnetic field;
   comparing the first and second signals; and
   based on the comparing act, rendering an indication of the cause of the spike.

2. The method of claim 1, wherein the act of inducing a small magnetic field includes closely juxtaposing a permanent magnet with the head.

3. The method of claim 1, wherein the act of inducing a small magnetic field includes closely juxtaposing an electromagnet with the head and energizing the electromagnet.

4. The method of claim 1, comprising executing the method using a spin stand.

5. The method of claim 1, comprising indicating a thermal asperity if the signals are substantially similar to each other.

6. The method of claim 1, comprising indicating a defect in the SUL if the signals are not substantially similar to each other.

7. The method of claim 1, comprising visually comparing the signals.

8. The method of claim 1, wherein the signals are compared by a computer rendering the indication.

9. A test fixture, comprising:
   means for spinning a disk past a read head;
   means for obtaining first and second read back signals with no local magnetic field induced by the head and with a local magnetic field induced by the head, respectively; and
   means for comparing the signals to determine whether a defect exists on the surface of the disk or below the surface of the disk.

10. The test fixture of claim 9, wherein the disk is a perpendicular recording disk, and wherein if the signals are not substantially similar to each other, a defect below the surface is indicated, otherwise a defect on the surface is indicated.

11. The test fixture of claim 10, comprising a movable permanent magnet closely juxtaposable with the read head to induce the local magnetic field.

12. The test fixture of claim 10, comprising an electromagnet closely juxtaposable with the read head to induce the local magnetic field.

13. The test fixture of claim 10, wherein the means for comparing includes a visual display.

14. The test fixture of claim 10, wherein the means for comparing includes a computer.

15. A computer program product on a medium readable by a digital processing apparatus to execute logic comprising:
   comparing a first signal from a read head positioned over a perpendicular recording disk under a first magnetic condition to a second signal from the read head obtained under a second magnetic condition, the signals indicating a defect in the disk; and
   if the signals are substantially similar, indicating a thermal asperity, otherwise indicating a defect in magnetically soft underlayer of the disk.

16. The computer program product of claim 15, wherein the first magnetic condition is the absence of a local magnetic field by the disk and the second magnetic condition is the presence of a local magnetic field by the disk.

17. The computer program product of claim 16, wherein the local magnetic field is induced by a permanent magnet selectively movable next to the read head.

18. The computer program product of claim 16, wherein the local magnetic field is induced by an electromagnet.

* * * * *